UNITED STATES PATENT OFFICE.

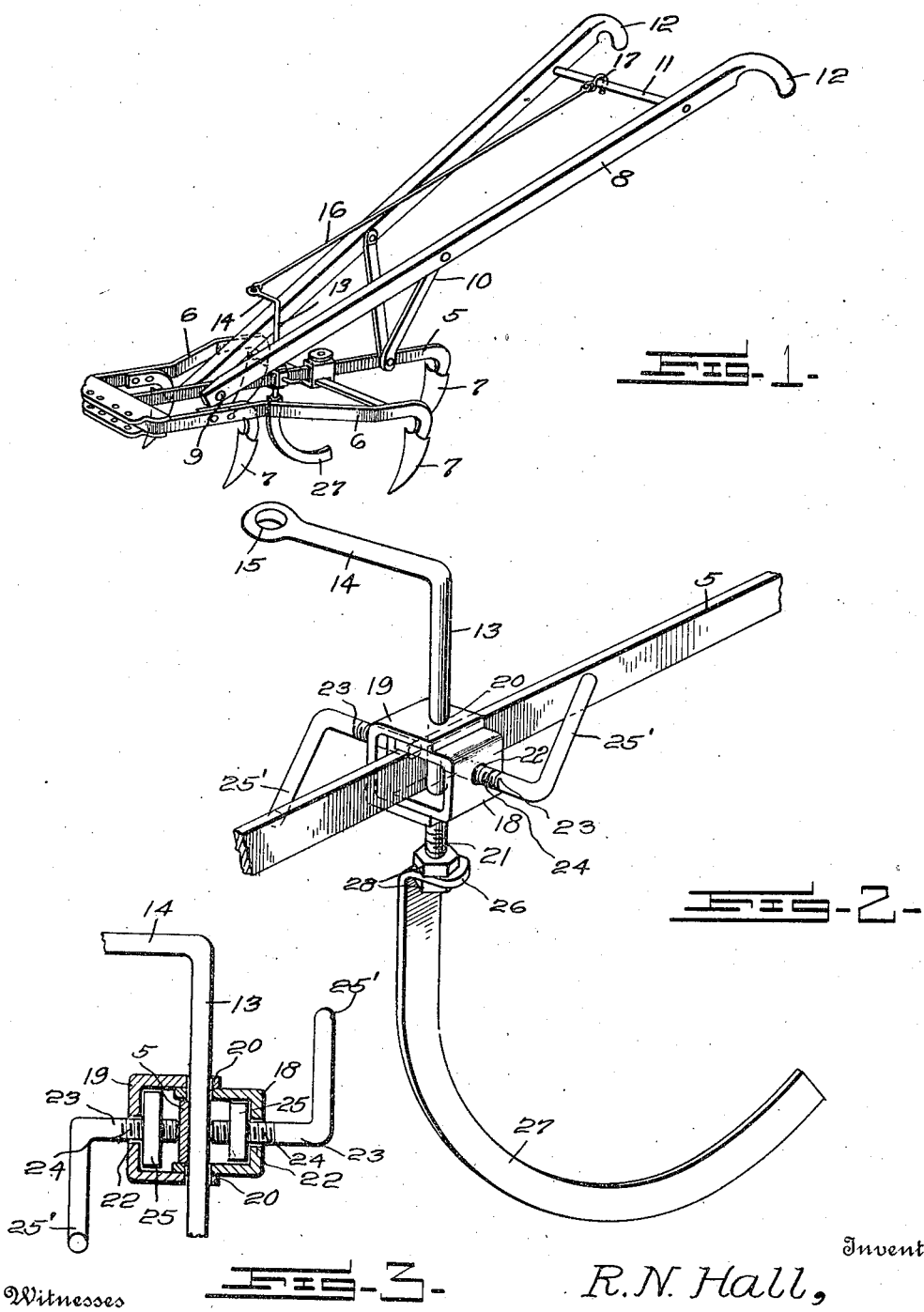

RICHARD N. HALL, OF WHITE STONE, VIRGINIA.

ATTACHMENT FOR CULTIVATORS.

1,318,144.　　　　Specification of Letters Patent.　　Patented Oct. 7, 1919.

Application filed June 23, 1919. Serial No. 306,104.

*To all whom it may concern:*

Be it known that I, RICHARD N. HALL, a citizen of the United States, residing at White Stone, in the county of Lancaster and State of Virginia, have invented certain new and useful Improvements in Attachments for Cultivators, of which the following is a specification.

My invention relates to an attachment for connection with a cultivator for engagement with the soil to steady the cultivator in operation, causing the same to operate as steadily as a plow.

An important object of the invention is to provide means for connecting a ground engaging shoe or runner with a bar of the cultivator, so that the shoe may be turned laterally in either direction, vertically adjusted, and clamped in adjustment when desired.

A further object of the invention is to provide means for attaching the ground engaging shoe or element with the bar of the cultivator, without the necessity of forming openings in the bar or otherwise altering the construction of the cultivator.

A further object of the invention is to provide a device of the above mentioned character, which is simple in construction, cheap to manufacture, strong and durable.

Other objects and advantages of the invention will be apparent during the course of the following description.

In the accompanying drawings, forming a part of this specification and in which like numerals are employed to designate like parts throughout the same, Figure 1 is a perspective view of an attachment embodying my invention, showing the same in use, Fig. 2 is an enlarged perspective view of the attachment, and, Fig. 3 is a fragmentary front elevation of the same.

In the drawings, wherein for the purpose of illustration is shown a preferred embodiment of my invention, the numeral 5 designates the center bar of a cultivator and 6 the outer or side bars. These bars are connected in the usual manner and carry hoes or shares 7. Connected with the center bar 5 are handles 8, as shown at 9, and brace bars 10 are also connected with these handles and with the rear end of the bar 5. The rear ends of the handles 8 are connected by a transverse rod or spoke 11, arranged near the hand grips 12, as shown. The foregoing description is that of the ordinary cultivator.

My attachment which is applied to the center bar 5, embodies a vertical rock shaft 13, provided at its upper end with a horizontal crank 14, apertured at 15 for pivotal connection with a rod 16. A cable or other flexible element may be substituted for the rod 16, if desired. The rod 16 is preferably provided at its rear end with a hook 17 to engage over the spoke 11, thereby retaining the rod in convenient reach of the operator, so that he may move the same to turn the vertical rock shaft 13.

A friction clamping device of novel construction is employed to hold the vertical rock shaft 13 upon the bar 5, the same comprising a pair of U-shaped brackets 18 and 19, the bracket 18 being the smaller and fitting within the bracket 19. These U-shaped brackets are provided near the ends of their horizontal arms with openings 20, which receive the vertical rock shaft 13 and are preferably slightly larger than the same, so that its lower screw threaded end 21 may freely pass through these openings. The U-shaped bracket 18 straddles the bar 5, while the bracket 19 receives the bracket 18. The rock shaft 13 is then passed through the openings 20, and contacts with one side of the bar 5, as shown.

The U-shaped brackets 18 and 19 are provided in their sides with openings 22, which are not screw threaded, and which receive clamping elements 23, such openings being larger than these clamping elements. The inner ends of the clamping elements 23 are screw threaded, as shown at 24, and these screw threaded ends engage nuts 25, arranged within the U-shaped brackets 18 and 19, and held thereby against turning movement. As clearly shown in Fig. 3, the inner end of one clamping element 23 engages the bar 5, while the inner end of the other clamping element engages the rock shaft 13. The clamping elements 23 are provided at their outer ends with cranks 25, for turning them.

The lower screw threaded end 21 of the rock shaft 13 is adapted to be passed through a smooth opening in a lateral extension or ear 26 formed upon a ground engaging runner or shoe 27. The screw threaded portion 21 carries nuts 28, arranged above and below the ear 26, and adapted to clamp the element 27 to the rock shaft 13. The element or shoe 27 is curved longitudinally throughout its entire length and extends rearwardly.

In operation, when the cultivator is traveling upon a hillside, the ground engaging element 27 by contacting with the ground will hold the cultivator from moving or slipping laterally, thereby causing the same to operate steadily. By a proper adjustment of the clamping elements 23, the rock shaft 13 may be held against vertical displacement, but the same may be turned by virtue of the leverage of the crank 14. It is thus apparent that the element 27 may be angularly adjusted by the operator, pulling upon the rod 16, during the operation of the cultivator, when necessary. Furthermore the rock shaft 13 may be vertically adjusted or turned to the desired position and securely locked in this adjustment by the manipulation of the clamping elements 23. By adjusting the element 27 to a point below the hoes 7 the device will function as a carrier. The device can also be set to operate to or from the row regardless of the movement of the horse.

It is to be understood that the form of my invention herewith shown and described is to be taken as a preferred example of the same and that various changes in the shape, size, and arrangement of parts may be resorted to without departing from the spirit of my invention, or the scope of the subjoined claims.

Having thus described my invention, I claim:

1. A cultivator attachment of the character described comprising a runner curved throughout its entire length and provided at its upper end with an apertured lateral extension, a rock shaft having its lower end screw threaded and extending through the apertured extension, a pair of clamp nuts carried by the screw threaded end of the rock shaft and arranged upon opposite sides of the apertured extension, and means to connect the rock shaft with the bar of the cultivator.

2. A cultivator attachment of the character described, comprising a runner to engage with the soil, a substantially vertical rock shaft connected with the runner and provided with a laterally extending crank, a friction clamping device carried by the bar of the cultivator and having alined openings to pivotally receive the substantially vertical rock shaft so that it may be turned upon its longitudinal axis, said friction clamping device normally holding the rock shaft against vertical displacement and adapted to be adjusted whereby the rock shaft may be vertically adjusted with relation to the clamping device, and an operating element connected with the crank and extending near the handles of the cultivator.

3. A cultivator attachment of the character described, comprising a runner provided at its upper end with a lateral extension having an aperture, a substantially vertical rock shaft having its lower end extending into the aperture, clamping means for holding the lower end of the rock shaft within the apertured lateral extension, means for pivotally connecting the substantially vertical rock shaft with a bar of the cultivator, a crank carried by the rock shaft, and an operating element connected with the crank and extending near the handles of the cultivator.

In testimony whereof I affix my signature in presence of two witnesses.

RICHARD N. HALL.

Witnesses:
 JOHN A. MCKINNEY,
 R. A. GEE.